United States Patent
Godowski et al.

(10) Patent No.: US 10,291,700 B2
(45) Date of Patent: May 14, 2019

(54) NETWORK OPTIMIZED SCAN WITH DYNAMIC FALLBACK RECOVERY

(71) Applicant: International Business Machines Corporation, Armonk, NY (US)

(72) Inventors: Piotr P. Godowski, Cracow (PL); Artur Obrzut, Cracow (PL); Luigi Pichetti, Rome (IT); Jacek J. Stezowski, Zakliczyn (PL)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 15/017,915

(22) Filed: Feb. 8, 2016

(65) Prior Publication Data

US 2017/0230452 A1  Aug. 10, 2017

(51) Int. Cl.
*G06F 17/30* (2006.01)
*H04L 29/08* (2006.01)
*G06F 11/14* (2006.01)

(52) U.S. Cl.
CPC ...... H04L 67/1095 (2013.01); *G06F 11/1464* (2013.01); *G06F 17/30575* (2013.01); *G06F 2201/84* (2013.01)

(58) Field of Classification Search
CPC ........... G06F 17/30575; G06F 11/1464; G06F 2201/84
USPC ........................................................ 707/638
See application file for complete search history.

(56) References Cited

U.S. PATENT DOCUMENTS

| | | | |
|---|---|---|---|
| 6,366,930 B1* | 4/2002 | Parker | G06F 21/565 |
| 6,847,982 B2 | 1/2005 | Parker et al. | |
| 7,802,301 B1* | 9/2010 | Dreyer | H04L 63/1408 |
| | | | 726/24 |
| 8,150,961 B1* | 4/2012 | Bird | G06Q 10/087 |
| | | | 709/219 |
| 8,402,544 B1* | 3/2013 | Soubramanien | G06F 21/564 |
| | | | 713/150 |
| 8,443,445 B1* | 5/2013 | Andruss | G06F 21/564 |
| | | | 726/24 |

(Continued)

OTHER PUBLICATIONS

Disclosed Anonymously et al., "Intelligent method of software inventory scan optimalization based on sensor scans", An IP.com Prior Art Database Technical Disclosure, IP.com No. 000237868, printed on Dec. 4, 2015, 3 pages.

(Continued)

*Primary Examiner* — Thanh-Ha Dang
(74) *Attorney, Agent, or Firm* — David B. Woycechowsky (57) ABSTRACT

As disclosed herein a computer-implemented method includes receiving a delta scan from an endpoint system comprising changes to a baseline inventory, and determining if the delta scan can be processed. The method further includes responsive to determining that the delta scan can be processed, processing the delta scan to produce a synchronized baseline inventory, and responsive to determining that the delta scan cannot be processed, indicating that the delta scan is unable to be processed. The method further includes responsive to indicating the delta scan is unable to be processed, receiving a most recent full system scan from the endpoint system to provide a new synchronized baseline inventory. A computer program product and a computer system corresponding to the above method are also disclosed herein.

12 Claims, 4 Drawing Sheets

(56) References Cited

U.S. PATENT DOCUMENTS

| | | | | |
|---|---|---|---|---|
| 8,555,391 | B1* | 10/2013 | Demir | H04L 67/20 713/187 |
| 2005/0132382 | A1* | 6/2005 | McGuire | G06F 8/658 719/311 |
| 2006/0248309 | A1* | 11/2006 | D'Alterio | G06F 8/61 711/206 |
| 2009/0150878 | A1* | 6/2009 | Pathak | G06F 8/65 717/172 |
| 2010/0030777 | A1* | 2/2010 | Panwar | G06Q 10/087 707/600 |
| 2010/0174763 | A1* | 7/2010 | Pastorelli | G06F 11/3006 707/822 |
| 2012/0110174 | A1* | 5/2012 | Wootton | G06F 21/564 709/224 |
| 2014/0079043 | A1* | 3/2014 | Montemurro | H04W 52/0216 370/338 |
| 2014/0108469 | A1* | 4/2014 | Majka | G06F 17/3007 707/821 |

OTHER PUBLICATIONS

Disclosed Anonymously et al., "Real-time scanning of software inventory", An IP.com Prior Art Database Technical Disclosure, IP.com No. 000225137, printed on Dec. 4, 2015, 3 pages.

\* cited by examiner

NETWORK OPTIMIZED SCAN WITH DYNAMIC FALLBACK RECOVERY

BACKGROUND

The present invention relates to system data scanning, and more particularly to network optimized delta scanning with error recovery.

In the highly computerized world of today, both the number of computers as well as the amount of software and data stored on computers is increasing. In an effort to monitor information technology inventory, many corporations perform scans on each computer to identify, inventory, and monitor both the software products and hardware used within the corporation. Although the scans may occur on each individual computer or device, the scan results may be transferred over a network and stored in a common location, enabling analysis of the scan results. The corporation may use the scan results to detect security issues, monitor software licensing requirements or to maintain an inventory of assets.

SUMMARY

As disclosed herein a computer-implemented method includes receiving a delta scan from an endpoint system comprising changes to a baseline inventory, and determining if the delta scan can be processed. The method further includes responsive to determining that the delta scan can be processed, processing the delta scan to produce a synchronized baseline inventory, and responsive to determining that the delta scan cannot be processed, indicating that the delta scan is unable to be processed. The method further includes responsive to indicating the delta scan is unable to be processed, receiving a most recent full system scan from the endpoint system to provide a new synchronized baseline inventory. A computer program product and a computer system corresponding to the above method are also disclosed herein.

DETAILED DESCRIPTION

Corporations rely on computers to manage and maintain many aspects of their day to day business operations. Furthermore, corporations and personnel within corporations are using an increasing number of computing devices (e.g., smart phones, tablets, desktop computers, laptop computers, specialized computer servers, and the like) when conducting business. Additionally, the number of software products installed on the computing devices, may also be increasing, making it difficult for the corporation to accurately maintain an inventory of the IT assets in use.

Corporations may use scanning tools (e.g., asset discovery software or security scanning software) to scan computing devices and collect raw data corresponding to the scanned devices. The raw data my include, for example, information identifying hardware characteristics and configuration, information identifying all installed software products, or information pertaining to security concerns corresponding to the scanned device. After the scanning operation on a particular device is complete, the raw scan data may be stored in a central location (e.g., a server) to enable data analysis on either an individual computing device or on a combination of computing devices.

Large corporations may manage many remotely located systems. For example a corporation using IBM® Software Use Analysis may manage up to 250,000 systems (e.g., computing devices). If not properly managed, transmitting scan information corresponding to a large number of systems can overwhelm the network causing network congestion or possibly even a network failure. It has been observed that network traffic, and thus network congestion, corresponding to system scans may be greatly reduced if only the data identifying changes between two consecutive scans (e.g., delta scans) were transmitted over the network.

Figure 1:
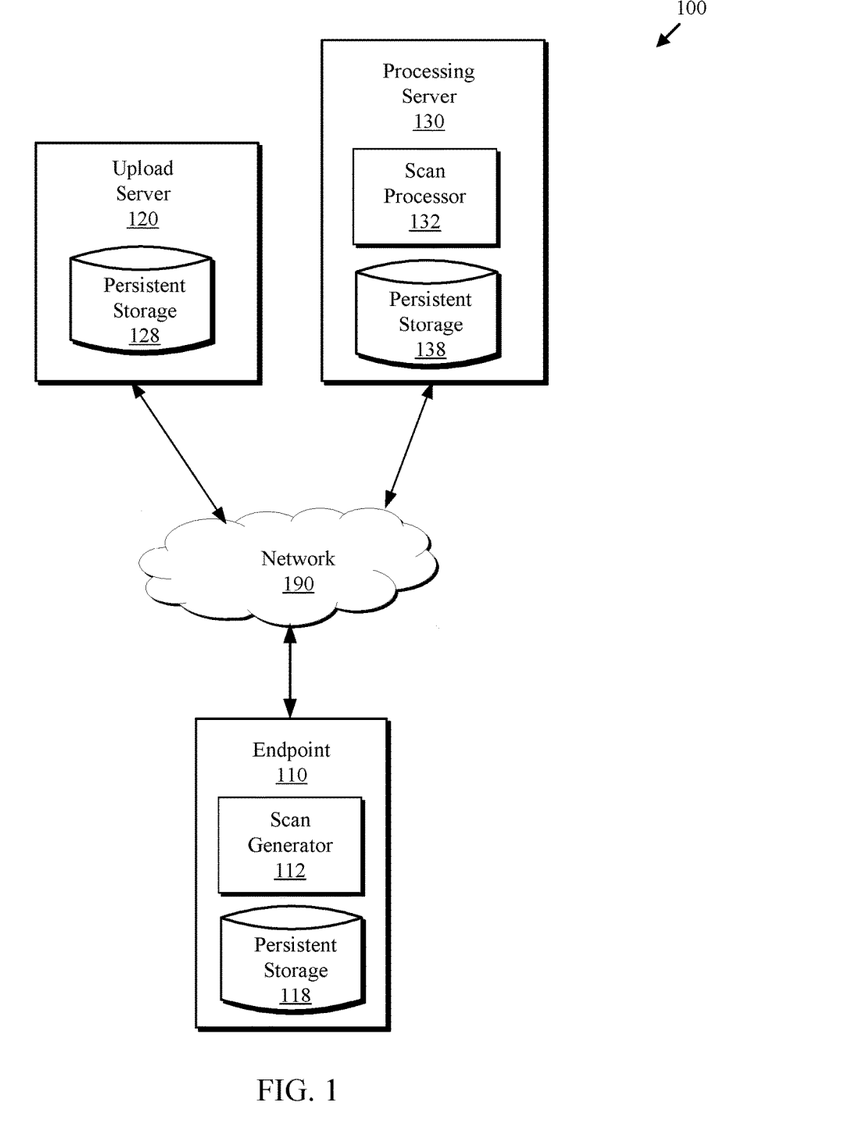
FIG. 1 is a functional block diagram depicting a computing environment, in accordance with at least one embodiment of the present invention.

The present invention leverages the above observations and will now be described in detail with reference to the Figures. FIG. 1 is a functional block diagram depicting a computing environment 100, in accordance with an embodiment of the present invention. Computing environment 100 represents an environment where a scanning operation is running to monitor each endpoint (e.g., endpoint 110) included in computing environment 100. The scanning operation may, for example, scan endpoint 110 to identify installed software products installed on endpoint 110, identify hardware and peripherals corresponding to endpoint 110, or identify security concerns/vulnerabilities. Computing environment 100 depicts only one endpoint 110 device, however, there may be additional endpoint devices (not shown) included in computing environment 100. In some embodiments, upload server 120 and processing server 130 are also endpoint devices.

Endpoint 110, upload server 120, and processing server 130 are computing devices that may include smart phones, tablets, desktop computers, laptop computers, specialized computer servers, or the like that are capable of processing instructions and communicating over network 190. In general, endpoint 110, upload server 120, and processing server 130 are representative of any electronic devices, or combination of electronic devices, capable of executing machine-readable program instructions, as described in greater detail with regard to FIG. 4.

As depicted, endpoint 110 includes scan generator 112 and persistent storage 118. Scan generator 112 may be configured to perform system scans that detect all software products installed on endpoint 110. In some embodiments, scan generator 112 collects a full system scan that includes raw data that identifies all software products detected on endpoint 110. Scan generator 112 may then produce a delta system scan (hereinafter, delta scan) by comparing the current full system scan with the most recent (prior) full system scan, and identifying the differences between the two full system scans. The delta scan may include a sequence identifier to identify an order in which the delta scan was created, and to assure the delta scan is processed in sequential order by scan processor 132. The delta scan may be provided to upload server 120 over network 190. If no prior full system scan exists, then a delta scan cannot be produced, and the current full system scan may be provided to upload server 120 as a baseline inventory.

The current full system scan, the current delta scan and the next sequence identifier may be stored on persistent storage 118. The information may be stored in a file system using files, in a database, or by any other means familiar to those of skill in the art. In some embodiments, storage usage is minimized by only retaining the most recent full system scan. In some embodiments, retaining a predetermined number of full system scans provides a scan history.

Upload server 120 may be a collection server that collects and stores scan data produced by scan generator 112 on endpoint 110. Upload server 120 may collect scan data corresponding to each endpoint in computing environment 100 (e.g., endpoint 110 and others not shown). Upload server 120 may retain scan data received from each endpoint on persistent storage 128. In some embodiments, upload server 120 retains only the latest scan data from endpoint 110. In other embodiments, upload server 120 retains each scan data receive until it is processed by processing server 130.

In some embodiments, upload server 120 notifies processing server 130 that scan data has been received from endpoint 110. In other embodiments, after providing scan data to upload server 120, endpoint 110 notifies processing server 130 that new scan data is available on upload server 120.

Processing server 130 may maintain a synchronized baseline inventory (e.g., a copy of the baseline scan) corresponding to endpoint 110. The synchronized baseline inventory may be maintained by merging, in a specified sequence, delta scan data and the existing synchronized baseline inventory. As depicted, processing server 130 includes scan processor 132 and persistent storage 138. Scan processor 132 may receive a notification that a delta scan is available for processing on upload server 120. In some embodiments, scan processor 132 receives the notification from upload server 120 that scan data has been received from endpoint 110. In other embodiments, scan processor 132 receives the notification by endpoint 110 that scan data is available on upload server 120.

Scan processor 132 may retrieve/receive scan data corresponding to endpoint 110 from upload server 120. Upon receiving the scan data, scan processor 132 may begin processing the scan data by determining if the scan is a full system scan or a delta scan. If the scan data is a full system scan, then scan processor 132 may store the full scan and the associated sequence identifier as a new synchronized baseline inventory on persistent storage 138. If the scan data is a delta scan, then scan processor 132 may process the delta scan by (i) confirming that the delta scan is able to be processed; (ii) merging the delta scan with a baseline inventory that is stored on persistent storage 138; and (iii) retaining, on persistent storage 138, the sequence identifier of the next update to be processed. If scan processor 132 determines that a delta scan is unable to be processed, then scan processor 132 may indicate the error to endpoint 110 and request a new full system scan be provided. In some embodiments, scan processor 132 indicates the error to endpoint 110 by updating a scan-recovery system property for endpoint 110. In other embodiments, scan processor 132 indicates the error to endpoint 110 by sending a message to endpoint 110 over network 190.

In some embodiments, upload server 120 and processing server 130 are located proximate to each other (e.g., in the same data center). In other embodiments, upload server 120 and processing server 130 are remotely located from each other. Upload server 120 and processing server 130 each include persistent storage (e.g., persistent storage 128 and 138). In the depicted embodiment, upload server 120 and processing server 130 each include separate persistent storage. In other embodiments, upload server 120 and processing server 130 access shared network attached storage. In another embodiment, upload server 120 and processing server 130 access shared storage that is procured from a cloud service.

Persistent storage 118, 128, and 138 may be any non-volatile storage device or media known in the art. For example, persistent storage 118, 128, and 138 can be implemented with a tape library, optical library, solid state storage, one or more independent hard disk drives, or multiple hard disk drives in a redundant array of independent disks (RAID). Similarly, data on persistent storage 118, 128, and 138 may conform to any suitable storage architecture known in the art, such as a file, a relational database, an object-oriented database, and/or one or more tables.

Endpoint 110, upload server 120, processing server 130, and other electronic devices (not shown) communicate over network 190. Network 190 can be, for example, a local area network (LAN), a wide area network (WAN) such as the Internet, or a combination of the two, and include wired, wireless, or fiber optic connections. In general, network 190 can be any combination of connections and protocols that will support communications between endpoint 110, upload server 120, and processing server in accordance with an embodiment of the present invention.

Figure 2:
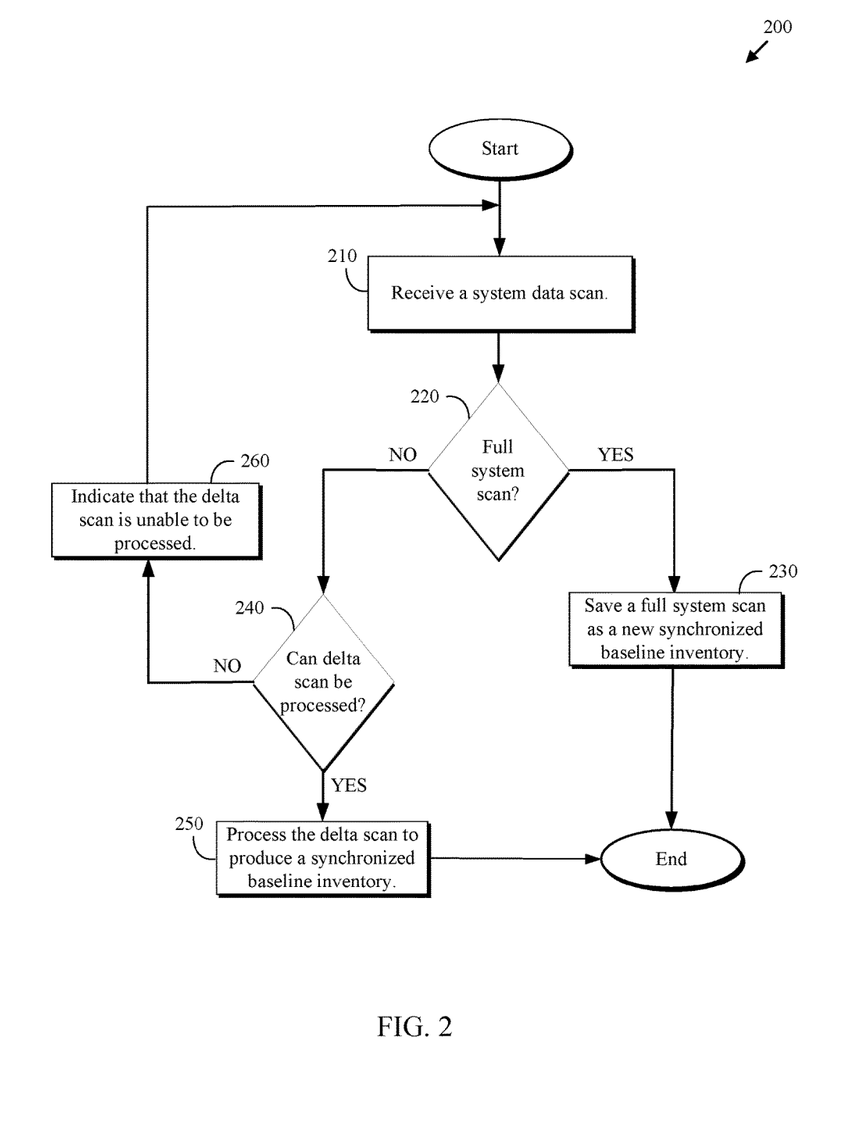
FIG. 2 is a flowchart depicting a delta scan processing method, in accordance with at least one embodiment of the present invention.

FIG. 2 is a flowchart depicting scan processing method 200, in accordance with at least one embodiment of the present invention. As depicted, scan processing method 200 includes receiving (210) a system data scan, determining (220) whether a system data scan is a full system scan, saving (230) a full system scan as a new baseline inventory, determining (240) whether a delta scan can be processed, processing (250) a delta scan, and indicating (260) a delta scan is unable to be processed. Scan processing method 200 enables processing server 130 to receive and process both full system scan data and delta scan data.

Receiving (210) a system data scan may include scan processor 132 receiving an unprocessed data scan from an upload server (e.g., upload server 120). In some embodiments, scan processor 132 receives, form upload server 120, a notification that a data scan is available for processing, and then scan processor 132 retrieves the data scan from upload server 120. In other embodiments, scan processor 132 receives a notification from upload server 120 that includes a data scan. The received data scan may include information identifying the endpoint from which it was created. Additionally, the data scan may contain a sequence identifier and raw data collected during a scan operation on the corresponding endpoint.

Determining (220) whether a system data scan is a full system scan may include scan processor 132 analyzing the content of the system data scan to determine if the content includes full replacement data (e.g., a full system scan) or update information such as additions, deletions, and modifications to an existing synchronized baseline inventory (e.g., a delta scan).

In some embodiments, the first record of the scan data contains an indicator that identifies contents of the scan as either a full system scan or a delta scan. In other embodiments, the scan content is identified by the name of the file containing the scan data. For example, a full system scan may be named data_011_full.scan while a delta scan may be named data_011_delta.scan If system data scan is a full system scan, then scan processing method 200 proceeds to the save operation 230. Otherwise scan processing method 200 proceeds to the determining (240) operation.

Saving (230) a full system scan as a new baseline inventory may include scan processor 132 determining where on persistent storage 138 the current synchronized baseline inventory is retained, and then replacing the current synchronized baseline inventory with the newly received scan data, resulting in the newly received scan data becoming a new synchronized baseline. Additionally, scan processor 132 may obtain a sequence identifier corresponding to the new baseline inventory and retain the sequence identifier on persistent storage 138 to assure proper processing of any follow-on delta scans. In some embodiments, the retained sequence identifier is incremented prior to being stored, and identifies the expected value of the sequence identifier corresponding to the next delta scan. In other embodiments, the retained sequence identifier identifies the last successfully processed scan.

Determining (240) whether a delta scan can be processed may include scan processor 132 comparing the value of a sequence identifier corresponding to the delta scan with the value of an expected sequence identifier corresponding to the synchronized baseline inventory that is targeted to be updated. If the sequence identifiers match, the delta update is confirmed to be the expected update. Scan processor 132 may perform additional consistency checks familiar to those of skill in the art to verify the validity of the delta scan. In some embodiments, scan processor 132 performs a parity check to assure the file has not been altered or damaged during the transmission process. In some embodiments, the delta scan has been encrypted, and requires a correct decryption key prior to being processed. If the delta scan can be processed, then scan processing method 200 proceeds to the process operation 250. Otherwise scan processing method 200 proceeds to indicating (260) a delta scan is unable to be processed.

Processing (250) a delta scan may include scan processor 132 merging the delta scan with the synchronized baseline inventory corresponding to the delta scan, and producing a new synchronized baseline inventory. Additionally, scan processor 132 may update the stored sequence identifier to indicate the expected sequence value of the next delta scan corresponding to the new synchronized baseline inventory. In some embodiments, after processing of a delta scan has terminated, either successfully or unsuccessfully, the delta scan is deleted from processing server 130. In other embodiments, only successfully processed delta scans are removed from processing server 130, and those that are unsuccessful are retained for problem analysis and resolution.

Indicating (260) a delta scan is unable to be processed may include scan processor 132 notifying endpoint 110 that an issue has been encountered while attempting to process a delta scan. Scan processor 132 may also request that the most recent full system scan be provided to establish a new baseline inventory. In some embodiments, endpoint 110 places the most recent full system scan on upload server 120. In other embodiments, endpoint 110 generates a new full system scan and places the new full system scan on upload server 120. Once a new full system scan is available to processing server 130, scan processor 132 may process the full system scan producing a new synchronized baseline inventory. The inability to process a delta scan has been automatically detected, and a newly refreshed synchronized baseline inventory has been automatically created.

In a large-scale scenario (e.g., a corporation using IBM® Software Use Analysis that may manage up to 250,000 systems) using a top-down message/request approach, where a processing server communicates directly with each endpoint, may not scale well. In some embodiments, a policy based approach is used to manage situations where a delta scan is unable to be processed. In some embodiments, the policy based approach may include (i) a Boolean scan-recovery property (SRP) associated with each endpoint; (ii) a dynamic scan-recovery group (SRG) to which all endpoints with an SRP=true automatically join; and (iii) a scan-recovery policy action (SRPA) which defines an action to be performed on or by the members of the SRG (e.g., the endpoints that are members of the SRG are required to provide a latest full scan to processing server 130).

Scan processor 132 may process scan data from multiple endpoints at one time (e.g., using ETL processing). During execution, scan processor 132 determines that a delta scan corresponding to endpoint 110 is unable to be processed. In some embodiments, scan processor 132 maintains a list of endpoints that provided scan data that was unable to be processed. At the end of the ETL process, a single action sets the SRP=true for each endpoint identified in the list of endpoints. In other embodiments, immediately upon detecting an error, scan processor 132 sets the SRP=true for endpoint 110.

During the next evaluation operation, each endpoint with SRP=true will join the SRG. The SRG has a SRPA that requires each member of the SRG to provide, to processing server 130, a latest full system. In some embodiments, endpoint 110 connects with processing server 130 on a determined schedule to determine if endpoint 110 is a member of any dynamic groups (e.g., SRG). In other embodiments, endpoint 110 connects with processing server 130, when network bandwidth policies permit, to determine if endpoint 110 is a member of any dynamic groups (e.g., SRG). If endpoint 110 is a member of the SRG, endpoint 110 executes any required actions (e.g., providing the most recent full system scan to processing server 130.

After scan processor 132 has successfully received and processed the requested full system scan from endpoint 110, the SRP corresponding to endpoint 110 is updated (reset) to indicate the latest scan was successfully processed (e.g., SRP=false). In some embodiments, updating the SRP to indicate the latest scan was successfully processed causes endpoint 110 to be removed from the SRPA. In other embodiments, scan processor 132 removes endpoint 110 from the SRG. The inability to process a delta scan has been automatically detected, and a newly refreshed synchronized baseline inventory has been automatically created.

Figure 3:
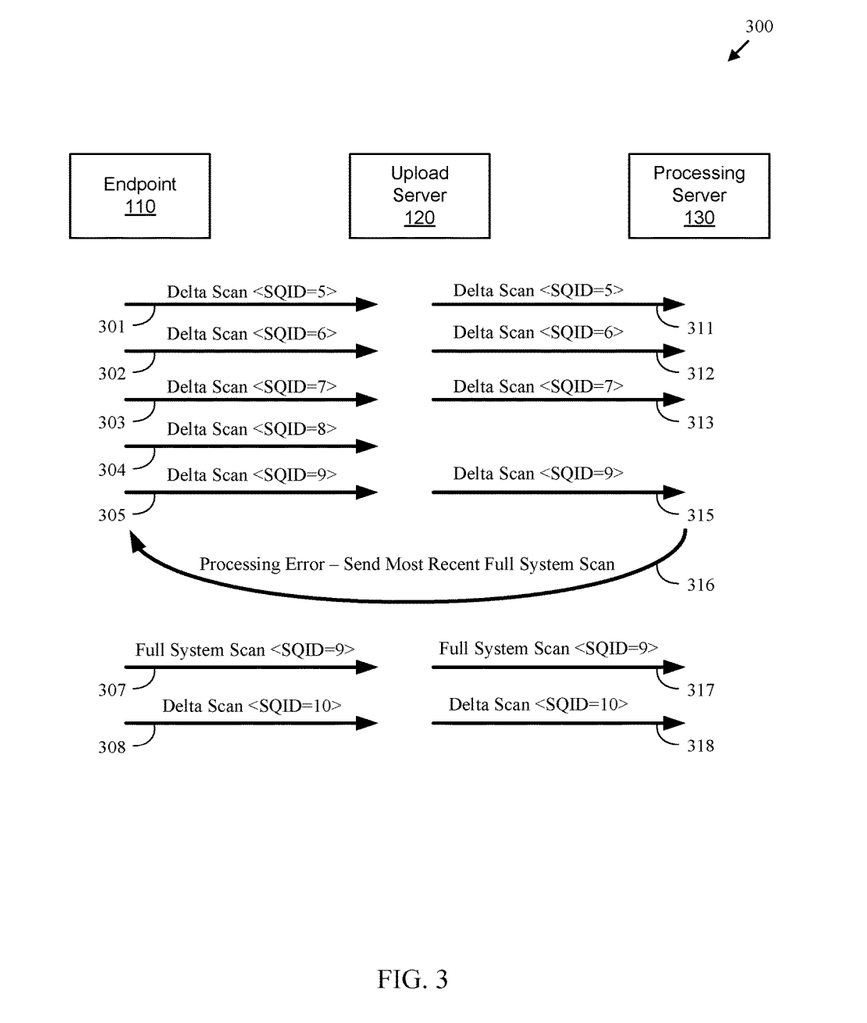
FIG. 3 depicts an example of an auto recovery after a failed delta scan migration, in accordance with at least one embodiment of the present invention.

FIG. 3 depicts example 300 of an auto recovery after a failed delta scan migration, in accordance with at least one embodiment of the present invention. As depicted, example 300 includes endpoint 110, upload server 120, and processing server 130. In the depicted example, endpoint 110 is running full system scans and generating delta scans that identify differences (changes) detected on endpoint 110 over a duration between a prior full system scan and the current full system scan. Endpoint 110 may produce a new delta scan based on a predetermined (e.g., selectable) schedule. In some embodiments, a new scan operation that provides a new delta scan is initiated once a week. In other embodiments, a new scan operation that provides a new delta scan is initiated once a day. In some embodiments, a new scan operation that provides a new delta scan is manually initiated by a user.

In the depicted example, endpoint 110 generates a delta scan with a sequence identifier of 5 (SQID=5). The delta scan is stored on upload server 120 (flow 301), and then provided to processing server 130 (flow 311) to be merged into a synchronized baseline inventory. This process is repeated for the delta scan with SQID=6 (flow 302 and flow 312) and the delta scan with SQID=7 (flow 303 and flow 313). When endpoint 110 generates delta scan with SQID=8, the delta scan is successfully stored on upload server 120 (flow 304), however, processing server 130 never receives delta scan with SQID=8. It is not clear why processing server 130 did not receive delta scan with SQID=8. There may have been a network outage preventing upload server 120 from providing delta scan with SQID=8 to processing server 130, or processing server 130 may have been in a maintenance window and was unavailable to receive delta scan with SQID=8.

Prior to processing server 130 receiving and processing delta scan with SQID=8, endpoint 110 generates delta scan with SQID=9. Delta scan with SQID=9 is stored on upload server 120 (flow 305) and provided to processing server 130 (flow 315). Processing server 130 is expecting delta scan with SQID=8 but has received delta scan with SQID=9, and therefore is unable to process (merge) the current delta scan with the synchronized baseline inventory. Processing server 130 indicates to endpoint 110 that there has been a processing error, and requests that the most recent full system scan be provided (flow 316).

Endpoint 110 responds by transmitting full system scan with SQID=9 to upload server 120 (flow 307), and upload server provides full system scan with SQID=9 to processing server 130 (flow 317). Processing server 130 processes full system scan with SQID=9 establishes a new synchronized baseline inventory, and is also expecting the next SQID to be SQID=10. Endpoint 110 continues normal operations, and generates delta scan with SQID=10 which is stored on upload server 120 (flow 308) and provided to processing server 130 (flow 318).

In the depicted example, smaller delta scans identifying only changes to a system environment are transmitted over the network for processing. The delta scans are sequentially merged to maintain a synchronized baseline inventory. Transmitting only the smaller delta scans (as opposed to full system scans), reduces network congestion that may be caused by a transmitting full system scans after each scan operation. However, if an issue is encountered processing a delta scan, the processing server that experiences the issue automatically detects the issue and requests a full system scan be provided to automatically re-establish a synchronized baseline inventory.

Figure 4:
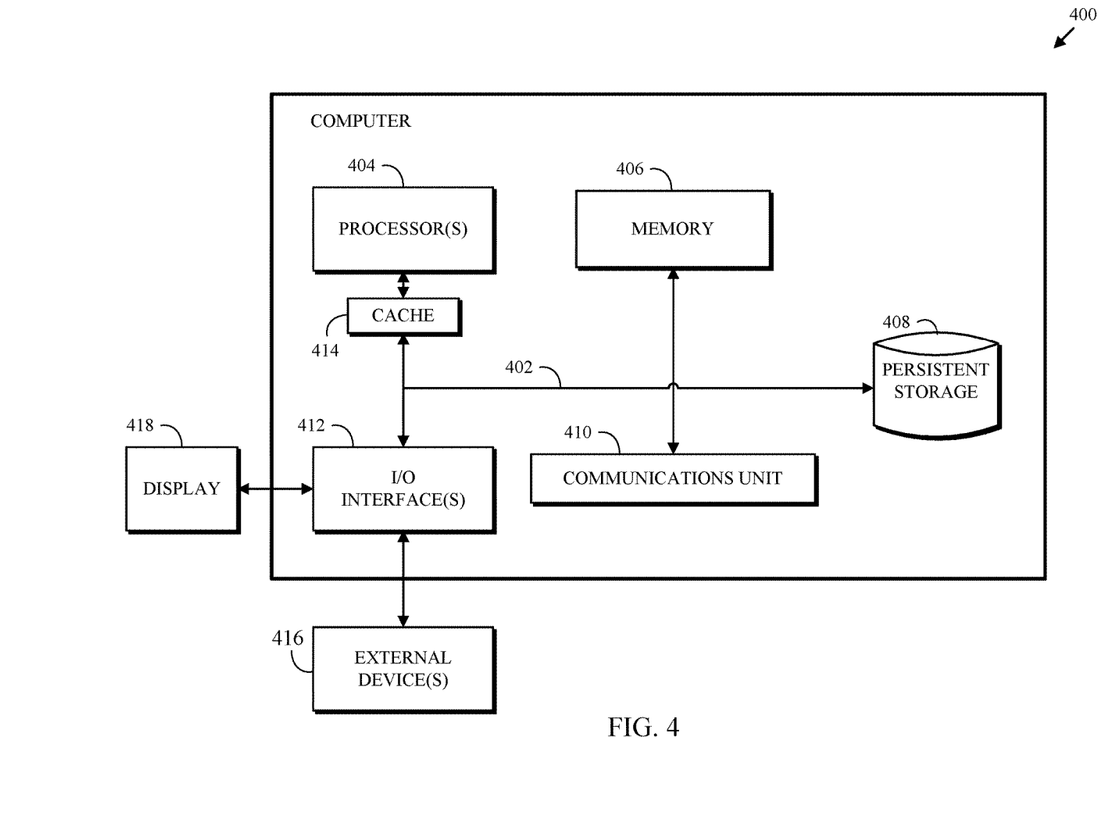
FIG. 4 is a functional block diagram depicting various components of one embodiment of a computer suitable for executing the methods disclosed herein.

FIG. 4 depicts a functional block diagram of components of a computer system 400, which is an example of systems such as endpoint 110, upload server 120, and processing server 130 within computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Endpoint 110, upload server 120, and processing server 130 include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., scan processing method 200 is stored in persistent storage 408 for execution and/or access by one or more of the respective processor(s) 404 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of endpoint 110, upload server 120, and processing server 130. In these examples, communications unit 410 includes one or more network interface cards. Communications unit 410 may provide communications through the use of either or both physical and wireless communications links. Program instructions and data used to practice embodiments of scan processing method 200 may be downloaded to persistent storage 408 through communications unit 410.

I/O interface(s) 412 allows for input and output of data with other devices that may be connected to each computer system. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method comprising:
receiving, from an endpoint computing device, over a communication network and by a processing server, a first set of scan data set(s), with each given scan data set of the first set of scan data set(s) including information indicative of: (i) a scan identification number, and (ii) an identification of a plurality software products detected on the endpoint computing device at a time of generation of the given scan data set;

subsequent to the receipt of the first set of scan data set(s), receiving, from the endpoint computing device, over the communication network and by the processing server, an out-of-sequence delta scan data set, with first out-of-sequence delta scan data set including information indicative of: (i) a scan identification number; and (ii) changes in an identity of a plurality software products detected on the endpoint computing device, at a time of generation of the out-of-sequence delta scan data set, relative to an identification of the plurality of software products indicated a previous delta scan so that the information indicating the changes in the identity of the plurality of software products detected on the endpoint computing device reduces network congestion of the communication network;

determining, by machine logic of the processing server, that the scan identification number of the out-of-sequence delta scan data set is incorrect based upon a comparison of: (i) the scan identification number of the out-of-sequence delta scan data set, and (ii) a scan identification number of a last scan data set of the first set of scan data set(s);

responsive to the determination that the scan identification number of the out-of-sequence delta scan data set is incorrect, requesting, by the processing server, over the communication network and to the endpoint computing device, a current full scan data set; and responsive to the request for the current full scan data set, receiving, from the endpoint computing device, over the communication network and by the processing server, the current full scan data set including information explicitly indicating an identity of all software products of the plurality of software products installed on the endpoint computing device at a time of generation of the current full scan data set.

2. The method of claim 1 wherein the first set of scan data set(s) includes:
a baseline scan data set including information explicitly indicating an inventory indicating an identity of all software products of the plurality of software products installed on the endpoint computing device at a time that the baseline scan data set is generated; and
a sequential plurality of delta scan data sets, with each given delta scan of the sequential plurality of delta scan data sets indicating changes in the inventory of software products installed on the endpoint computing device relative to an immediately previous scan.

3. The method of claim 1 further comprising:
analyzing, by at least one computing device of a plurality of computing devices, the identity of all software products of the plurality of software products installed on the endpoint computing device at a time of generation of the current full scan data set in order to maintain accuracy of the identity of all software products.

4. The method of claim 1 wherein the determination that the scan identification number of the out-of-sequence delta scan data set is incorrect includes:
storing the scan identification number of a delta scan data set received immediately previous in sequence relative to the out-of-sequence delta scan data set;
receiving an increment value;
incrementing the scan identification number of a delta scan data set received immediately previous in sequence relative to the out-of-sequence delta scan data set by the increment value to obtain an expected identification number; and
determining that the scan identification number of the out-of-sequence delta scan data set is different than the expected identification number.

5. A computer program product (CPP) comprising:
a machine readable storage device; and
computer code stored on the machine readable storage device, with the computer code including instructions and data for causing a processor(s) set to perform operations including the following:
receiving, from an endpoint computing device, over a communication network and by a processing server, a first set of scan data set(s), with each given scan data set of the first set of scan data set(s) including information indicative of: (i) a scan identification number, and (ii) an identification of a plurality software products detected on the endpoint computing device at a time of generation of the given scan data set,
subsequent to the receipt of the first set of scan data set(s), receiving, from the endpoint computing device, over the communication network and by the processing server, an out-of-sequence delta scan data set, with first out-of-sequence delta scan data set including information indicative of: (i) a scan identification number; and (ii) changes in an identity of a plurality software products detected on the endpoint computing device, at a time of generation of the out-of-sequence delta scan data set, relative to an identification of the plurality of software products indicated a previous delta scan so that the information indicating the changes in the identity of the plurality of software products detected on the endpoint computing device reduces network congestion of the communication network,
determining, by machine logic of the processing server, that the scan identification number of the out-of-sequence delta scan data set is incorrect based upon a comparison of: (i) the scan identification number of the out-of-sequence delta scan data set, and (ii) a scan identification number of a last scan data set of the first set of scan data set(s),
responsive to the determination that the scan identification number of the out-of-sequence delta scan data set is incorrect, requesting, by the processing server, over the communication network and to the endpoint computing device, a current full scan data set, and
responsive to the request for the current full scan data set, receiving, from the endpoint computing device, over the communication network and by the processing server, the current full scan data set including information explicitly indicating an identity of all software products of the plurality of software products installed on the endpoint computing device at a time of generation of the current full scan data set.

6. The CPP of claim 5 wherein the first set of scan data set(s) includes:
a baseline scan data set including information explicitly indicating an inventory indicating an identity of all software products of the plurality of software products installed on the endpoint computing device at a time that the baseline scan data set is generated; and
a sequential plurality of delta scan data sets, with each given delta scan of the sequential plurality of delta scan data sets indicating changes in the inventory of software products installed on the endpoint computing device relative to an immediately previous scan.

7. The CPP of claim 5 further comprising:

analyzing, by at least one computing device of a plurality of computing devices, the identity of all software products of the plurality of software products installed on the endpoint computing device at a time of generation of the current full scan data set in order to maintain accuracy of the identity of all software products.

8. The CPP of claim 5 wherein the determination that the scan identification number of the out-of-sequence delta scan data set is incorrect includes:

storing the scan identification number of a delta scan data set received immediately previous in sequence relative to the out-of-sequence delta scan data set;

receiving an increment value;

incrementing the scan identification number of a delta scan data set received immediately previous in sequence relative to the out-of-sequence delta scan data set by the increment value to obtain an expected identification number; and determining that the scan identification number of the out-of-sequence delta scan data set is different than the expected identification number.

9. A computer system (CS) comprising:

a processor(s) set;

a machine readable storage device; and computer code stored on the machine readable storage device, with the computer code including instructions and data for causing a processor(s) set to perform operations including the following:

receiving, from an endpoint computing device, over a communication network and by a processing server, a first set of scan data set(s), with each given scan data set of the first set of scan data set(s) including information indicative of: (i) a scan identification number, and (ii) an identification of a plurality software products detected on the endpoint computing device at a time of generation of the given scan data set, subsequent to the receipt of the first set of scan data set(s), receiving, from the endpoint computing device, over the communication network and by the processing server, an out-of-sequence delta scan data set, with first out-of-sequence delta scan data set including information indicative of: (i) a scan identification number; and (ii) changes in an identity of a plurality software products detected on the endpoint computing device, at a time of generation of the out-of-sequence delta scan data set, relative to an identification of the plurality of software products indicated a previous delta scan so that the information indicating the changes in the identity of the plurality of software products detected on the endpoint computing device reduces network congestion of the communication network, determining, by machine logic of the processing server, that the scan identification number of the out-of-sequence delta scan data set is incorrect based upon a comparison of: (i) the scan identification number of the out-of-sequence delta scan data set, and (ii) a scan identification number of a last scan data set of the first set of scan data set(s), responsive to the determination that the scan identification number of the out-of-sequence delta scan data set is incorrect, requesting, by the processing server, over the communication network and to the endpoint computing device, a current full scan data set, and responsive to the request for the current full scan data set, receiving, from the endpoint computing device, over the communication network and by the processing server, the current full scan data set including information explicitly indicating an identity of all software products of the plurality of software products installed on the endpoint computing device at a time of generation of the current full scan data set.

10. The CS of claim 9 wherein the first set of scan data set(s) includes:

a baseline scan data set including information explicitly indicating an inventory indicating an identity of all software products of the plurality of software products installed on the endpoint computing device at a time that the baseline scan data set is generated; and a sequential plurality of delta scan data sets, with each given delta scan of the sequential plurality of delta scan data sets indicating changes in the inventory of software products installed on the endpoint computing device relative to an immediately previous scan.

11. The CS of claim 9 further comprising:

analyzing, by at least one computing device of a plurality of computing devices, the identity of all software products of the plurality of software products installed on the endpoint computing device at a time of generation of the current full scan data set in order to maintain accuracy of the identity of all software products.

12. The CS of claim 9 wherein the determination that the scan identification number of the out-of-sequence delta scan data set is incorrect includes:

storing the scan identification number of a delta scan data set received immediately previous in sequence relative to the out-of-sequence delta scan data set;

receiving an increment value;

incrementing the scan identification number of a delta scan data set received immediately previous in sequence relative to the out-of-sequence delta scan data set by the increment value to obtain an expected identification number; and determining that the scan identification number of the out-of-sequence delta scan data set is different than the expected identification number.

* * * * *